(12) United States Patent
Street

(10) Patent No.: US 6,206,431 B1
(45) Date of Patent: Mar. 27, 2001

(54) SAFETY LOCKING COUPLING ASSEMBLY

(75) Inventor: David G. Street, Pottstown, PA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/343,136

(22) Filed: Jun. 29, 1999

Related U.S. Application Data

(63) Continuation-in-part of application No. 08/903,814, filed on Jul. 31, 1997.

(51) Int. Cl.$^7$ .................................................. F16L 37/18
(52) U.S. Cl. .............................. 285/80; 285/312; 285/87; 285/84
(58) Field of Search ................... 285/80–82, 84, 285/87, 88, 91, 312, 320

(56) References Cited

U.S. PATENT DOCUMENTS

| | | |
|---|---|---|
| 1,941,856 | 1/1934 | Fraley . |
| 2,518,026 | 8/1950 | Krapp . |
| 3,124,374 | 3/1964 | Krapp . |
| 3,439,942 | 4/1969 | Moore et al. . |
| 3,976,313 | 8/1976 | Lauffenburger et al. . |
| 4,222,593 | 9/1980 | Lauffenburger . |
| 4,295,670 | 10/1981 | Goodall et al. . |
| 4,691,942 | 9/1987 | Ford . |
| 4,802,694 | 2/1989 | Vargo . |
| 4,871,195 | 10/1989 | Parrish . |
| 5,042,850 | 8/1991 | Culler . |
| 5,295,717 | 3/1994 | Chen . |
| 5,338,069 | 8/1994 | McCarthy . |
| 5,368,343 | 11/1994 | Allen . |
| 5,435,604 | 7/1995 | Chen . |
| 5,462,316 | 10/1995 | Street et al. . |

FOREIGN PATENT DOCUMENTS

| | | |
|---|---|---|
| 0 742 402 | 11/1996 | (EP) . |
| 2 102 520 | 2/1983 | (GB) . |
| 94/25787 | 11/1994 | (WO) . |

OTHER PUBLICATIONS

Dixon Valve & Coupling Co., *List Price Catalog DPL195*, undated, 3 pages.
Ever–Tite Coupling Products, *102 Positive–Locking Handle Couplers*, 1995, 2 pages.
Action Hose Couplers, Ltd., *Leverlock Safety "Snaplock" Coupling*, undated, 2 pages.
U.S. Government Printing Office, *Military Standard MS 27019 Procurement Specifications MIL–C–27487*, 1985, 3 pages.
Military Specification, *Coupling Halves, Quick–Disconnect, Cam–Locking Type*, MIL–C–2748F, Sep. 19, 1986, 18 pages.

Primary Examiner—Teri Pham Luu
(74) Attorney, Agent, or Firm—Nancy T Krawczyk

(57) ABSTRACT

A safety locking coupling assembly in which pull rings on the female coupling unit of a male coupling unit/female coupling unit assembly serve both to release the coupling assembly and to maintain the coupling assembly locked against unintentional disconnection. The pull rings are attached to cam arms which engage the male coupling unit to lock the coupling assembly and are disengaged from the male coupling unit to release the coupling assembly. In the locked condition of the coupling assembly, the pull rings abut against ears on the housing of the female coupling unit to oppose unintended movement of the cam arms from the locked position of the cam arms to the released position of the cam arms. Upon intentional removal of the pull rings from abutment with the ears by an operator and pulling on the pull rings, the cam arms can be moved from the locked position of the cam arms to the released position of the cam arms to disconnect the coupling assembly.

22 Claims, 6 Drawing Sheets

SAFETY LOCKING COUPLING ASSEMBLY

This application is a Continuation-in-Part of Application Serial No. 08/903,814, filed Jul. 31, 1997, pending.

TECHNICAL FIELD

The present invention relates, in general, to couplings for connecting hoses and other conduits which carry fluids and, in particular, to a fluid coupling having a safety latching mechanism which can be operated to quickly connect and disconnect hoses and other conduits.

BACKGROUND OF THE INVENTION

Couplings for connecting hoses and other conduits which carry fluids have been in use for many years. One common form of such couplings, often referred to as cam and groove couplings or cam-lock couplings or cam locking quick-disconnect couplings, includes a female coupling unit on which a pair of cam arms are pivotally mounted in openings extending through the wall of the female coupling unit to the bore of the female coupling member and a male coupling unit, having a groove in an outside surface, is received in the bore of female coupling unit and is engaged by the cam arms in the groove of the male coupling unit to fix the male coupling unit in the female coupling unit. In an initial position in which the male coupling unit is inserted into the bore of the female coupling unit, the cam arms are pivoted radially outward providing clearance for the male coupling unit to be inserted. After the male coupling unit is inserted into the bore of the female coupling unit, the cam arms are pivoted inward drawing the male coupling unit into the bore of the female coupling unit to fix the male coupling unit in place while compressing a compressible sealing ring carried in a groove in the bore in the female coupling unit. To disconnect the coupling, the cam arms on the female coupling unit are pivoted outwardly to free the male coupling unit and permit removal of the male coupling unit.

Pressure fluctuations in the system or physically dragging the coupling can cause accidental disconnection of the coupling and a potentially hazardous spill or pressure release. Because of such potential safety hazards, many efforts have been made to improve the locking together of the male coupling unit and the female coupling unit. In some, a safety lock has been added which holds the cam arms on the female coupling unit in a closed position which is effective against pulsating pressure but ineffective against opening when the coupling is physically dragged.

Padlocks have been added to the couplings to protect against both unintentional and unauthorized disconnection of the coupling. Typically, the arrangements which have included a padlock have not been sufficiently effective in providing the desired protection.

Other efforts in the design of such couplings have involved the inclusion of parts which can be easily lost or misplaced or the addition of parts which adds cost and complexity to the couplings. Certain designs of such couplings are prone to the collection of dirt or debris making the couplings ineffective or inoperative.

Yet another problem with a number of prior art couplings is that the pull rings, which are carried by the cam arms, can become lodged between the cam arms and the body of the female coupling unit resulting in improper closure and connection of the male and female coupling units. In addition, these pull rings, which typically are carried loosely by the cam arms, are susceptible to being "hung up" on something as the coupling is physically dragged.

SUMMARY OF THE INVENTION

Accordingly, a safety locking coupling assembly, constructed in accordance with the present invention, includes a generally cylindrical male coupling unit and a female coupling unit which includes a generally cylindrical body, a cam arm mounted to the body of the female coupling unit, and a pull ring carried by the cam arm. The body of the female coupling unit has an inside wall defining a bore which extends axially of the body between first and second end faces of the body and within which the male coupling unit is fitted from the first end face of the body. The body also has an opening extending through the body and at least one ear projecting from an outside wall of the body adjacent the opening in the body. The cam arm is mounted to the body of the female coupling unit at the opening in body for pivotal movement relative to the body between a first pivotal locked position and a second pivotal released position. The cam arm has a cam surface projecting from within the opening in the body into the bore in the body and engaging the male coupling unit received by the bore in the body when the cam arm is in the first pivotal locked position and retracted into the first opening in the body from the bore in the body and disengaged from the male coupling unit received by the bore in the body when the cam arm is in the second pivotal released position. The cam arm also has an arm portion to which the pull ring is attached for pivotal movement of the pull ring relative to the cam arm between a first pivotal locked position and a second pivotal released position for moving the cam arm from the first pivotal locked position of the cam arm to the second pivotal released position of the cam arm. The pull ring abuts against the ear on the body of the female coupling unit upon pivotal movement of the cam arm from the first pivotal locked position of the cam arm toward the second pivotal released position of the cam arm while the pull ring is in the first pivotal locked position of the pull ring to prevent pivotal movement of the cam arm to the second pivotal released position of the cam arm and free of the ear upon pivotal movement of the pull ring from the first pivotal locked position of the pull ring to the second pivotal released position of the pull ring to permit pivotal movement of the cam arm to the second pivotal released position of the cam arm.

Although the embodiment of the present invention which is described below has two cam arms symmetrically disposed on the body of the female coupling unit, it will be understood that the present invention can be arranged with only one cam arm, particularly for smaller units, and with more than two cam arms, particularly for larger units.

Another aspect of the present invention which is described below is the manner in which the cam arm and the means by which the cam arm is mounted to the body of the female coupling unit are arranged to receive a padlock, whereby the safety locking coupling assembly is protected against tampering to a greater extent than prior art arrangements.

Yet a further aspect of the present invention is the configuration of the cam surface of the cam arm, whereby the cam arm is strengthened.

DETAILED DESCRIPTION OF THE INVENTION

Figure 1:
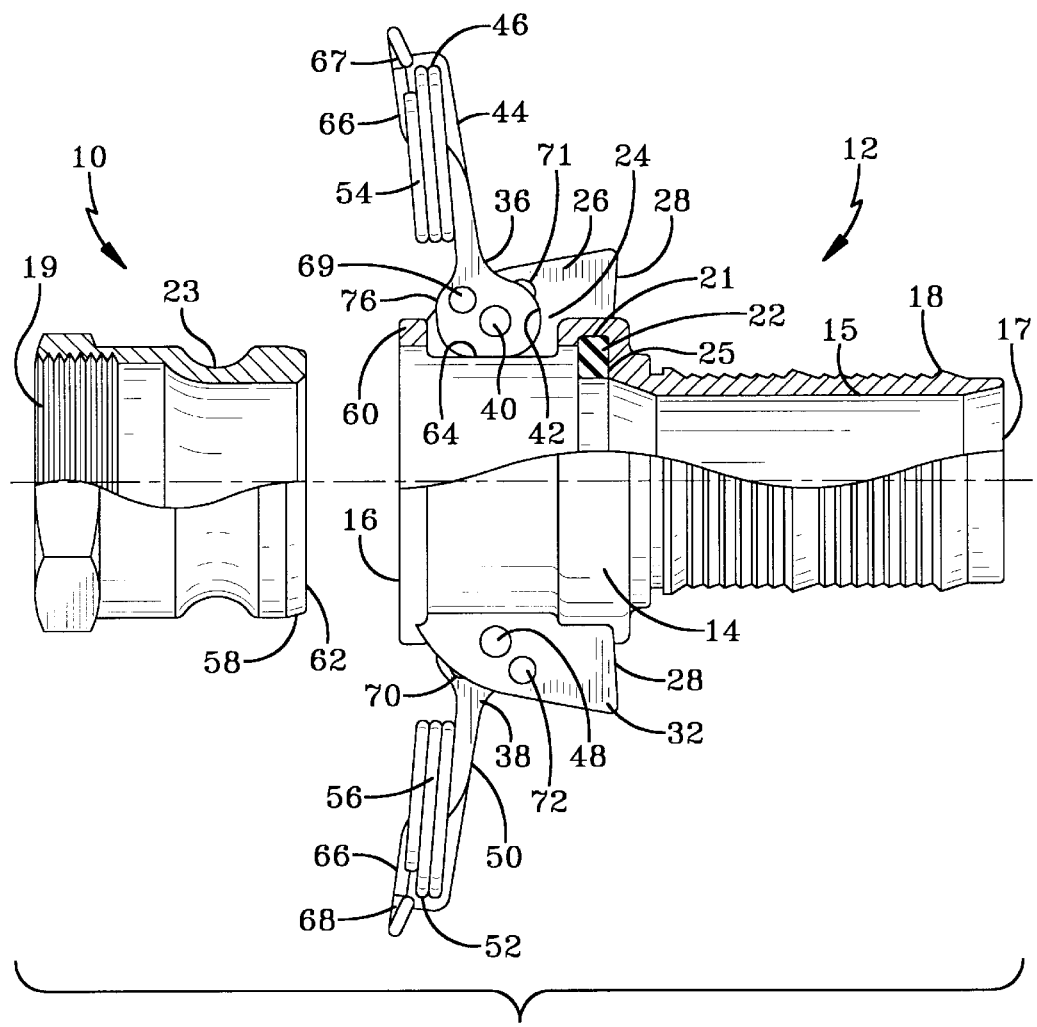
FIG. 1 is a side view, partially in section, of a safety locking coupling assembly, constructed in accordance with the present invention, prior to insertion of the male coupling unit into the female coupling unit.

Referring to the drawings, a safety locking coupling assembly, constructed in accordance with the present invention, includes a generally cylindrical male coupling unit 10 and a female coupling unit 12 which includes a generally cylindrical body 14 having an inside wall 15 defining a bore which extends axially of body 14 between first and second end faces 16 and 17 of body 14. Male coupling unit 10 is fitted within the bore of body 14 of female coupling unit 12 from first end face 16 of body 14. The opposite end of female coupling unit 12, for example arranged as a hose shank 18, and the opposite end of male coupling unit 10, for example having an internal thread 19, are adapted for attachment to hoses or pipes.

The bore in body 14 of female coupling unit 12 has a circumferential groove 21 in the inside wall of the body which is spaced from first end face 18 of the body. Female coupling unit 12 further includes a compressible sealing ring 22 positioned in circumferential groove 21 which extends into the bore beyond the inside wall of body 14. Male coupling unit 10 bears against sealing ring 22 tightly. A shoulder 25 of circumferential groove 21 in body 14 of female coupling unit 12 supports sealing ring 22 against axial movement. Male coupling unit 10 has a circumferential groove 23 in an outside surface.

Body 14 of female coupling unit 10 also has first and second diametrically opposed openings 24 extending through the body. Only one such opening is shown in the drawings. First and second ears 26, shown most clearly in FIG. 5, project from an outside wall of body 14 at opposite sides of first opening 24 in the body. First and second ears 26 have a sloped, arcade surface 28. Third and fourth ears 32, only one of which is shown in the drawings, project from the outside wall of body 14 at opposite sides of second opening 24 in body 14 and are similar to first and second ears 26.

Figure 4:
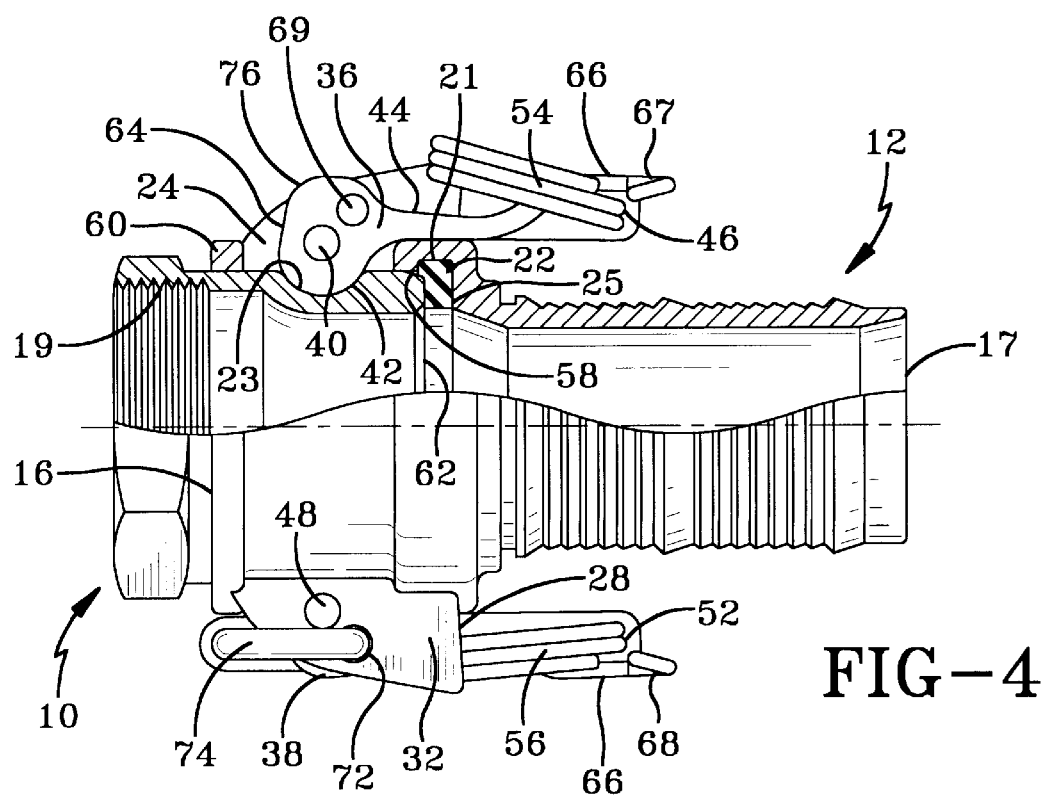
FIG. 4 is a side view, partially in section, of the FIG. 1 safety locking coupling assembly with the male coupling unit and the female coupling unit locked together.
Figure 5:
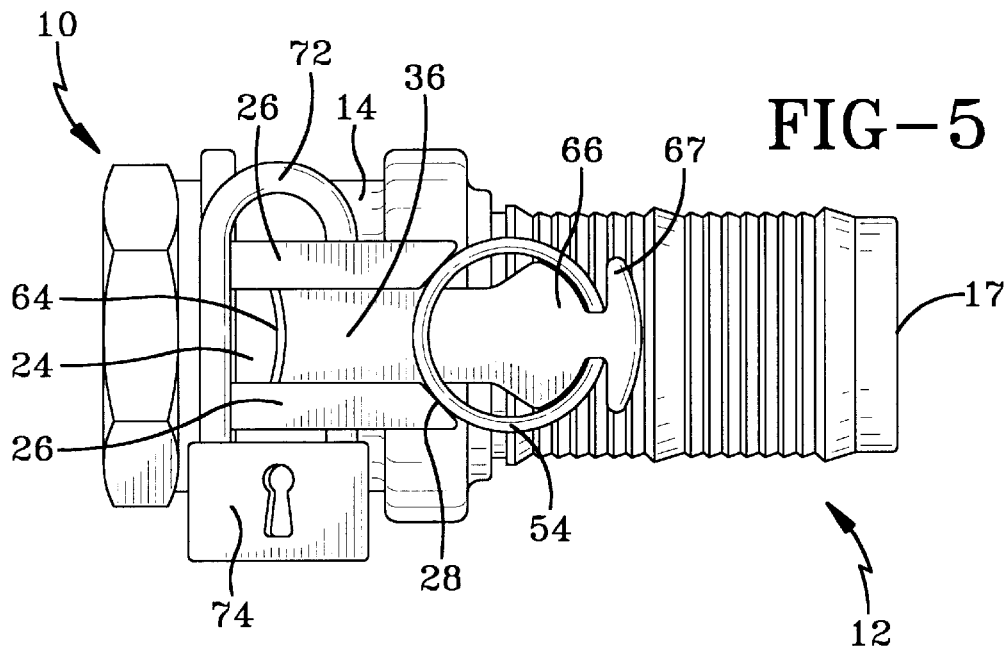
FIG. 5 is a top view of the FIG. 1 safety locking coupling assembly with the male coupling unit and the female coupling unit locked together.
Figure 6:
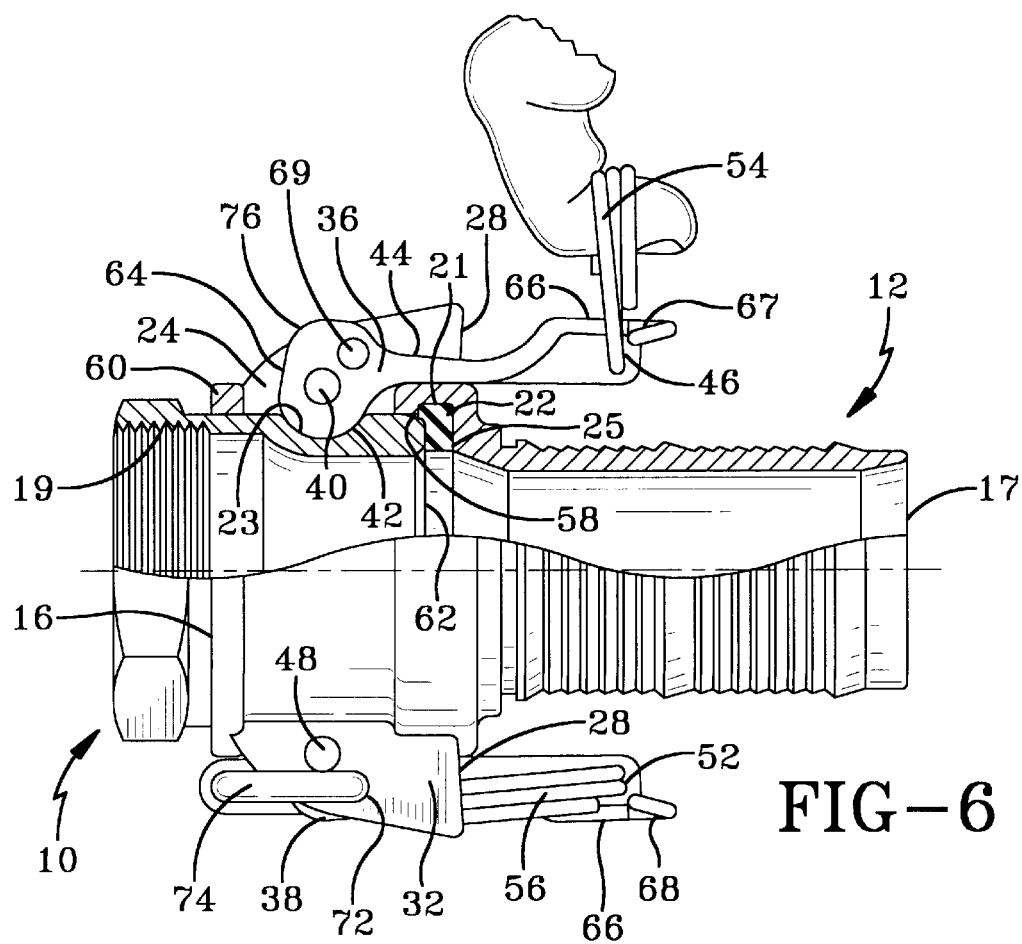
FIG. 6 is a side view, partially in section, of the FIG. 1 safety locking coupling assembly prepared for disconnection.

Female coupling unit 12 also has first and second cam arms 36 and 38 mounted to body 14 at first and second openings 24 in body 14, respectively, for pivotal movement relative to body 14 between a first pivotal locked position as shown in FIGS. 4, 5 and 6 and a second pivotal released position as shown in FIG. 1. First cam arm 36 is mounted to first and second ears 26 by a pivot pin 40 for pivotal movement between the first and the second ears.

First cam arm 36 has a first cam surface 42 projecting from within first opening 24 in body 14 into the bore in body 14 and engaging male coupling unit 10 received by the bore in body 14 when first cam arm 36 is in the first pivotal locked position and retracted into first opening 24 in body 14 from bore in body 14 and disengaged from male coupling unit 10 received by the bore in body 14 when first cam arm 36 is in the second pivotal released position. First cam arm 36 also has a first arm portion 44 which, for the embodiment of the invention being described, has a first through hole 46 extending through the width thereof at a free end of first arm portion 44.

Second cam arm 38 is mounted to third and fourth ears 32 by a pivot pin 48 for pivotal movement between the third and the fourth ears. Second cam arm 38 is similar to first cam arm 36 having a second cam surface, not shown but similar to first cam surface 42, and a second arm portion 50. The second cam surface of second cam arm 38 projects from within the second opening in body 14 of female coupling unit 12 into the bore in body 14 and engages male coupling unit 10 unit received by the bore in body 14 when second cam arm 38 is in the first pivotal locked position and is retracted into the second opening in body 14 from the bore in body 14 and disengaged from male coupling unit 10 received by the bore in body 14 when second cam arm 38 is in the second pivotal released position. For the embodiment of the invention being described, second arm portion 50 has a second through hole 52 extending through the width thereof at a free end of second arm portion 50.

Female coupling unit 12 also has first and second pull rings 54 and 56 attached, respectively, to first arm portion 44 of first cam arm 36 and second arm portion 50 of second cam arm 38. For the embodiment of the invention being described, pull rings 54 and 56 extend, respectively, through first through hole 46 in first arm portion 44 of first cam arm 36 and second through hole 52 in second arm portion 50 of second cam arm 38 for pivotal movement of the first and the second pull rings relative to the first and the second cam arms, respectively. First and second pull rings 54 and 56 can undergo pivotal movement between a first pivotal locked position and a second pivotal released position for moving first cam arm 36 and second cam arm 38, respectively, from the first pivotal locked positions of the cam arms to the second pivotal released positions of the cam arms. Each pull ring 54 and 56 is a resilient circular multiple turn coil and each of the pull rings and each through hole 46 and 52 through which the pull rings extend are dimensioned to bias the pull rings into a position against the arm portions of the cam arms to which they are mounted in the first pivotal locked positions of the pull rings and to permit overcoming the bias and permit pivotal movement of the pull rings away from arm portions of cam arm to which they are mounted to the second pivotal released position of the pull rings when the pull rings are pulled toward the second pivotal released position of the pull rings.

In particular, first pull ring 54 abuts against the sloped arcade surface 28 of first and second ears 26 upon pivotal movement of first cam arm 36 from the first pivotal locked position of the first cam arm toward the second pivotal released position of the first cam arm while the first pull ring is in the first pivotal locked position of the first pull ring to prevent pivotal movement of the first cam arm to the second pivotal released position of the first cam arm. First pull ring 54 is free of first and second ears 26 upon pivotal movement of the first pull ring from the first pivotal locked position of the first pull ring to said second pivotal released position of the first pull ring to permit pivotal movement of first cam arm 36 to the second pivotal released position of the first cam arm. Second pull ring 56, in cooperation with the sloped arcade surface 28 of third and fourth ears 32, effects locking and movement of second cam arm 38 in the same manner as first pull ring 54, in cooperation with first ears 26, effects locking and movement first cam ann 36.

Male coupling unit 10 preferably has a tapered end 58 and female coupling unit 12 preferably has an annular end radius 60 which together ease insertion of the male coupling unit into female coupling unit 12. An end face 62 of male coupling unit 10 is adapted to bear tightly against sealing ring 22 in female coupling unit 12.

Cam surfaces 42 of first cam arm 36 and second cam arm 38 have a relief 64 which allows insertion of male coupling unit 10 into female coupling unit 12. Relief 64 of cam surfaces 42 is an arcade concave surface aligned with the axis of male coupling unit 10 and the axis of female coupling unit 12 when cam arms 36 and 38 are in the pivotal released positions of the cam arms as shown in FIG. 1. The arcade nature of relief 64, shown in FIG. 5, provides added material to the cam arms as they follow the shape of male member 10 and thereby strengthens the cams.

Figure 2:
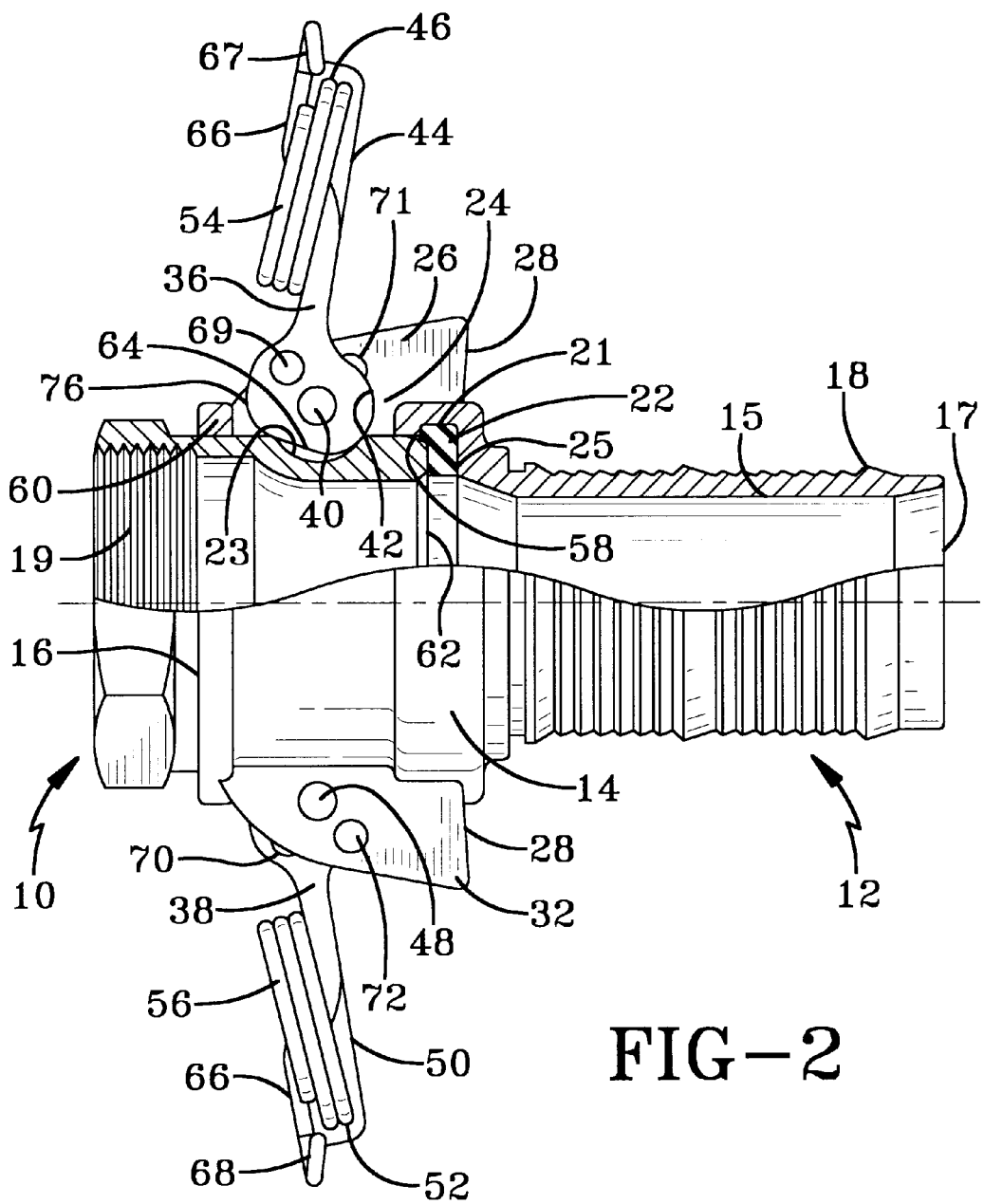
FIG. 2 is a side view, partially in section, of the FIG. 1 safetylocking coupling assembly after insertion of the male coupling unit into the female coupling unit but prior to locking together of the male and female coupling units.

The initial phase of insertion of male coupling unit 10 into female coupling unit 12 is shown in FIG. 2. Cam arms 36 and 38 have been moved slightly from the pivotal released positions of the cam arms, as shown in FIG. 1, toward the pivotal locked positions of the cam arms, as shown in FIGS. 3, 4 and 5, with cam surface 42 of the cam arm arms entering groove 23 in the outside surface of male coupling unit 10.

Figure 3:
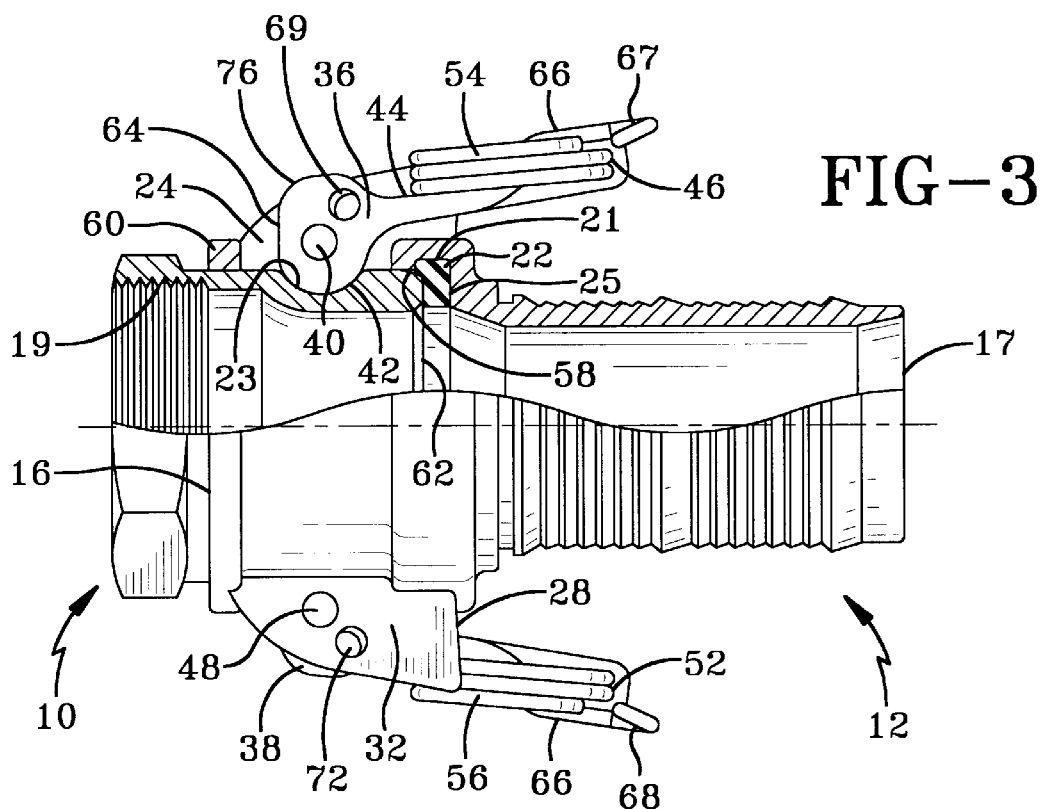
FIG. 3.is a side view, partially in section, of the FIG. 1 safety locking coupling assembly at a point intermediate the locked and unlocked conditions of the coupling assembly.

As shown most clearly in FIGS. 3, 4 and 5, which show male coupling unit 10 inserted in female coupling unit 12, cam surfaces 42 of cam arms 36 and 38 extend into and engage circumferential groove 23 in the outside surface of the male coupling unit when the cam arms are in the pivotal locked positions of the cam arms. As cam arms 36 and 38 are pivoted from the pivotal released positions of the cam arms to the pivotal locked positions of the cam arms, cam surfaces 42 of the cam arms further engage groove 23 in the outside surface of male coupling unit 10 and draw the male coupling unit into female coupling unit 12 and compress sealing ring 22. At the same time, pull rings 54 and 56 ride over first and second ears 26 and third and fourth ears 32, respectively, to snap against the associated ears. If cam arms 36 and 38 are not moved to the full pivotal locked positions of the cam arms, pull rings 54 and 56 will not ride over the ears and snap against the ears and the coupling assembly will not be safety locked. Preferably, cam arms 36 and 38 have an enlarged pad area 66 which facilitates moving the cam arms into the pivotal locked positions of the cam arms by providing a comfortable surface for the hand or heal of the hand of an operator to the exert necessary force to lock the coupling assembly.

Also, as shown most clearly in FIG. 5, cam arms 36 and 38 have extensions 67 and 68, respectively, beyond through holes 46 and 52, at the free ends of the arm portions of the cam arms. As shown most clearly in FIG. 6, extensions 67 and 68 limit pivotal movement of pull rings 54 and 56 away from the first pivotal locked positions of the pull rings to the second pivotal released positions of the pull rings to prevent undesired distortion of the pull rings when the pull rings are pulled to disconnect the coupling assembly and prevent the pull rings from passing to beneath the cam arms.

In addition, cam arms 36 and 38 have through holes 69 and 70, respectively, which are aligned with aligned through holes 71 and 72, respectively, in first and second ears 26 and third and fourth ears 32, respectively, when the cam arms are in the pivotal locked positions of the cam arms. A padlock 74 or similar device can be fitted through the aligned through holes to prevent further accidental opening of the coupling assembly or unauthorized opening of the coupling. With cam arms 36 and 38 resting against the body of the female coupling unit as shown in FIG. 4, padlock 74 prevents cam arm 38 from being moved even if pivot pin 48 is removed.

To disconnect the coupling assembly, a padlock, if employed to lock the coupling assembly, first is removed. Next, the operator inserts a finger into each pull ring 54 and 56, as shown in FIG. 6, to pull the pull rings from the pivotal locked positions of the pull rings to the pivotal released positions of the pull rings. Further pulling of the pull rings moves cam arms 36 and 38 from the pivotal locked positions of the cam arms to the pivotal released positions of the cam arms and withdraws cam surfaces 42 of the cam arms from groove 23 in the outside surface of male coupling unit 10.

Preferably, surfaces 76 of each cam arm 36 and 38 opposite from cam surfaces 42 are extended and act as a barrier to projections from the environment from accessing pull rings 54 and 56 unintentionally, as best shown in FIG. 4.

Figures 7A, 7B:
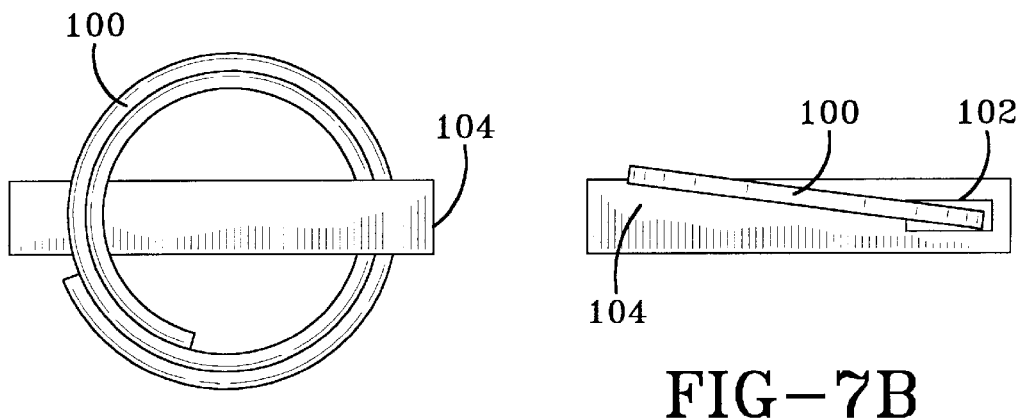
FIGS. 7A and 7B are top and side views, respectively, of a second pull ring arrangement which can be used in a safety locking coupling assembly constructed in accordance with the present invention.

FIGS. 7A and 7B show a second pull ring arrangement which can be used in a safety locking coupling assembly constructed in accordance with the present invention. In contrast to pull rings 54 and 56 that are resilient circular multiple turn coil rings that are axially would and extend through generally rectangular through holes 46 and 52 that are disposed perpendicular to the lengths of cam arms 36 and 38, pull ring 100 in FIGS. 7A and 7B is a resilient circular multiple coil ring that is radially wound and extends through a generally rectangular through hole 102 that is disposed axially of a cam arm 104. Pull ring 100 and through hole 102 are dimensioned to bias the pull ring into a position against cam arm 104 to which it is mounted in a first pivotal locked position of the pull ring and to permit overcoming the bias and permit pivotal movement of the pull ring away from the cam arm to a second pivotal released position of the pull ring when the pull ring is pulled toward the second pivotal released position of the pull ring.

Figures 8A, 8B:
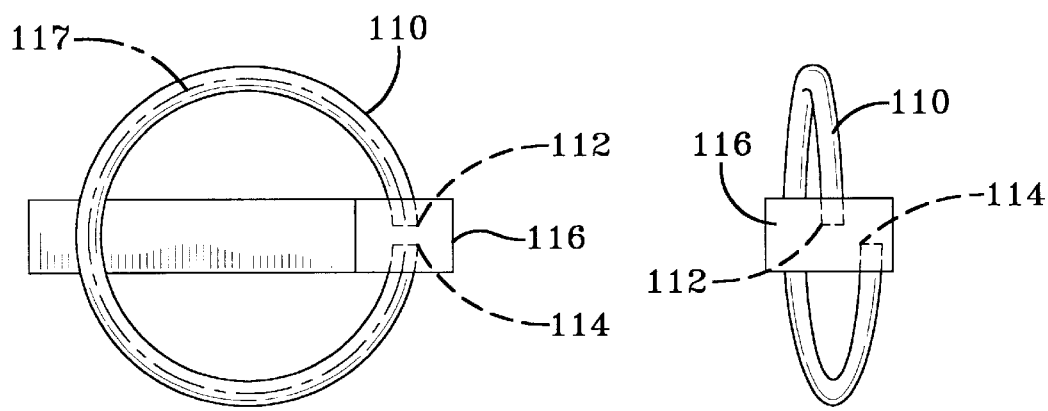
FIGS. 8A and 8B are top and side views, respectively, of a third pull ring arrangement which can be used in a safety locking coupling assembly constructed in accordance with the present invention.

Referring to FIGS. 8A and 8B, which are top and side views, respectively, of a third pull ring arrangement which can be used in a safety locking coupling assembly constructed in accordance with the present invention, the pull ring is a resilient circular split ring 110, the opposite ends of which extend into first and second holes 112 and 114 in opposite edges of a cam arm 116. With holes 112 and 114 generally aligned along the length of cam arm 116 and offset perpendicular to the length of the cam arm, pull ring is biased against the cam arm into a position against the cam arm. The bias, however, can be overcome to permit pivotal movement of pull ring 110 away from cam arm 116 to a second pivotal released position of the pull ring when the pull ring is pulled toward the second pivotal released position of the pull ring. Although ring 110 is shown as a single turn split ring, it will be apparent that ring 110 can have multiple turns as represented by the dot-dash line 117 in FIG. 8A.

Figure 9A:
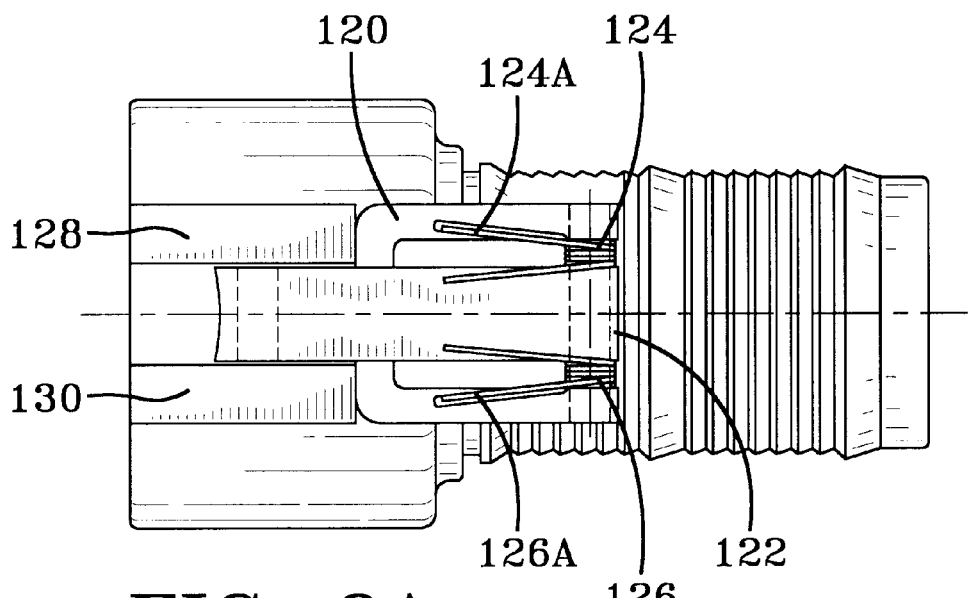
FIGS. 9A and 9B are top and side views, respectively, of a fourth pull ring arrangement which can be used in a safety locking coupling assembly constructed in accordance with the present invention.
Figure 9B:
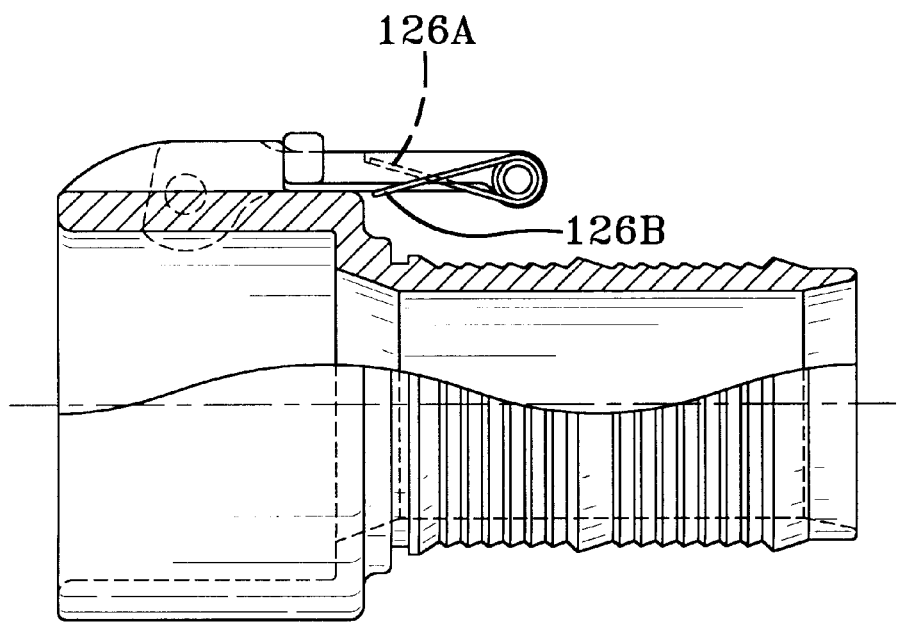

FIGS. 9A and 9B are top and side views, respectively, of a fourth pull ring arrangement which can be used in a safety locking coupling assembly constructed in accordance with the present invention. In this arrangement, the means for urging a pull ring 120 against a cam arm 122 include a pair of springs 124 and 126, in the form of torsion springs for the embodiment of the invention being described, extending between the cam arm and the pull ring to bias the pull ring into the position against the cam arm and permit overcoming the bias and permit pivotal movement of the pull ring away from the cam arm to the second pivotal released position of the pull ring when the pull ring is pulled toward the second pivotal released position of the pull ring. Specifically, a first end 124a and 126a of each torsion spring bears against the top of pull ring 120 and a second end 124b and 126b of each torsion spring bears against the bottom surface of cam arm 122.

In contrast to the other pull rings described above which are circular in shape, pull ring 120 in FIG. 9A is generally square. Therefore, it will be understood that pull rings used in a safety locking coupling assembly, constructed in accordance with the present invention, can be other than circular in shape. Moreover, the component which serves a finger pull member need not be a complete ring. For example, the finger pull member can be L-shaped, namely a portion of pull ring 120 in FIG. 9A that has only one leg and extends only far enough to engage only one of two ears 128 and 130 to retain the finger pull member in the pivotal locked position against the cam arm or far enough to engage both ears 128 and 130 to retain the finger pull member in the pivotal locked position against the cam arm.

While in the foregoing there have been described preferred embodiments of the present invention, it should be understood by those skilled in the art that various modifications and changes can be made without departing from the true spirit and scope of the present invention.

What is claimed:

1. A female coupling unit comprising:
   a generally cylindrical body having an inside wall defining a bore which extends axially of said body between first and second end faces of said body, said bore adapted for receiving a male coupling unit at said first end face of said body and said body further having:
   (a) an opening extending through said body, and
   (b) at least one ear projecting from an outside wall of said body adjacent said opening in said body;
   a cam arm mounted to said body at said opening in said body for pivotal movement relative to said body between a first pivotal locked position and a second pivotal released position and having:
   (a) a cam surface,
     (1) projecting from within said opening in said body into said bore in said body and adapted to engage a male coupling unit received by said bore in said body when said cam arm is in said first pivotal locked position, and
     (2) retracted into said opening in said body from said bore in said body and adapted to be disengaged from a male coupling unit received by said bore in said body when said cam arm is in said second pivotal released position, and
   (b) an arm portion;
   a pull ring attached to a free end of said of said arm portion of said cam arm for pivotal movement of said pull ring relative to said cam arm between a first pivotal locked position and a second pivotal released position for moving said cam arm from said first pivotal locked position of said cam arm to said second pivotal released position of said cam arm, said pull ring:
   (a) abutting against said ear upon pivotal movement of said cam arm from said first pivotal locked position of said cam arm toward said second pivotal released position of said cam arm while said pull ring is in said first pivotal locked position of said pull ring to prevent pivotal movement of said cam arm to said second pivotal released position of said cam arm, and
   (b) free of said ear upon pivotal movement of said pull ring from said first pivotal locked position of said pull ring to said second pivotal released position of said pull ring to permit pivotal movement of said cam arm to said second pivotal released position of said cam arm.

2. A female coupling unit according to claim 1 wherein said cam arm includes means for urging said pull ring into a position against said cam arm and in said first pivotal locked position of said pull ring.

3. A female coupling unit according to claim 2 wherein:
   (a) said pull ring is a resilient circular multiple turn coil, and
   (b) said means for urging said pull ring against said cam arm include a generally rectangular hole extending through the width of said arm portion of said cam arm through which said pull ring extends with said hole and said pull ring dimensioned to:
     (1) bias said pull ring into said position against said arm portion of said cam arm, and
     (2) permit overcoming said bias and permit pivotal movement of said pull ring away from said arm portion of said cam arm to said second pivotal released position of said pull ring when said pull ring is pulled toward said second pivotal released position of said pull ring.

4. A female coupling unit according to claim 3 wherein said pull ring is axially wound and said hole is disposed generally perpendicular to said cam arm.

5. A female coupling unit according to claim 3 wherein said pull ring is radially wound and said hole is disposed generally axially of said cam arm.

6. A female coupling unit according to claim 2 wherein:
   (a) said pull ring is a resilient circular split ring, and
   (b) said means for urging said pull ring against said cam arm include first and second holes in opposite edges of said arm portion of said cam arm generally aligned along the length of said cam arm and offset perpendicular to the length of said cam arm and into which opposite ends of said ring extend to:
     (1) bias said pull ring into said position against said arm portion of said cam arm, and
     (2) permit overcoming said bias and permit pivotal movement of said pull ring away from said arm portion of said cam arm to said second pivotal released position of said pull ring when said pull ring is pulled toward said second pivotal released position of said pull ring.

7. A female coupling unit according to claim 6 wherein said circular split ring has a single turn.

8. A female coupling unit according to claim 6 wherein said circular split ring has multiple turns.

9. A female coupling unit according to claim 2 wherein said means for urging said pull ring against said cam arm include a spring extending between said cam arm and said pull ring to:
   (a) bias said pull ring into said position against said arm portion of said cam arm, and
   (b) permit overcoming said bias and permit pivotal movement of said pull ring away from said arm portion of said cam arm to said second pivotal released position of said pull ring when said pull ring is pulled toward said second pivotal released position of said pull ring.

10. A female coupling unit according to claim 9 wherein said spring is a torsion spring having a first end bearing against a top surface of said pull ring and a second end bearing against a bottom surface of said cam arm.

11. A safety locking coupling assembly comprising:
a generally cylindrical male coupling unit, and
a female coupling unit including
(a) a generally cylindrical body having an inside wall defining a bore which extends axially of said body between first and second end faces of said body and within which said male coupling unit is fitted from said first end face of said body, said body further having:
(1) an opening extending through said body, and
(2) at least one ear projecting from an outside wall of said body adjacent said opening in said body;
(b) a cam arm mounted to said body at said opening in said body for pivotal movement relative to said body between a first pivotal locked position and a second pivotal released position and having:
(1) a cam surface,
(i) projecting from within said opening in said body into said bore in said body and adapted to engage said male coupling unit received by said bore in said body when said cam arm is in said first pivotal locked position, and
(ii) retracted into said opening in said body from said bore in said body and adapted to be disengaged from said male coupling unit received by said bore in said body when said cam arm is in said second pivotal released position, and
(2) an arm portion;
(c) a pull ring attached to a free end of said of said arm portion of said cam arm for pivotal movement of said pull ring relative to said cam arm between a first pivotal locked position and a second pivotal released position for moving said cam arm from said first pivotal locked position of said cam arm to said second pivotal released position of said cam arm, said pull ring:
(1) abutting against said ear upon pivotal movement of said cam arm from said first pivotal locked position of said cam arm toward said second pivotal released position of said cam arm while said pull ring is in said first pivotal locked position of said pull ring to prevent pivotal movement of said cam arm to said second pivotal released position of said cam arm, and
(2) free of said ear upon pivotal movement of said pull ring from said first pivotal locked position of said pull ring to said second pivotal released position of said pull ring to permit pivotal movement of said cam arm to said second pivotal released position of said cam arm.

12. A safety locking coupling assembly according to claim 11 wherein said cam arm includes means for urging said pull ring into a position against said cam arm and in said first pivotal locked position of said pull ring.

13. A safety locking coupling assembly according to claim 12 wherein:
(a) said pull ring is a resilient circular multiple turn coil, and
(b) said means for urging said pull ring against said cam arm include a generally rectangular hole extending through the width of said arm portion of said cam arm through which said pull ring extends with said hole and said pull ring dimensioned to:
(1) bias said pull ring into said position against said arm portion of said cam arm, and
(2) permit overcoming said bias and permit pivotal movement of said pull ring away from said arm portion of said cam arm to said second pivotal released position of said pull ring when said pull ring is pulled toward said second pivotal released position of said pull ring.

14. A safety locking coupling assembly according to claim 13 wherein said pull ring is axially wound and said hole is disposed generally perpendicular to said cam arm.

15. A safety locking coupling assembly according to claim 13 wherein said pull ring is radially wound and said hole is disposed generally axially of said cam arm.

16. A safety locking coupling assembly according to claim 12 wherein:
(a) said pull ring is a resilient circular split ring, and
(b) said means for urging said pull ring against said cam arm include first and second holes in opposite edges of said arm portion of said cam arm generally aligned along the length of said cam arm and offset perpendicular to the length of said cam arm and into which opposite ends of said ring extend to:
(1) bias said pull ring into said position against said arm portion of said cam arm, and
(2) permit overcoming said bias and permit pivotal movement of said pull ring away from said arm portion of said cam arm to said second pivotal released position of said pull ring when said pull ring is pulled toward said second pivotal released position of said pull ring.

17. A female coupling unit according to claim 16 wherein said circular split ring has a single turn.

18. A female coupling unit according to claim 16 wherein said circular split ring has multiple turns.

19. A safety locking coupling assembly according to claim 12 wherein said means for urging said pull ring against said cam arm include a spring extending between said cam arm and said pull ring to:
(a) bias said pull ring into said position against said arm portion of said cam arm, and
(b) permit overcoming said bias and permit pivotal movement of said pull ring away from said arm portion of said cam arm to said second pivotal released position of said pull ring when said pull ring is pulled toward said second pivotal released position of said pull ring.

20. A safety locking coupling assembly according to claim 19 wherein said spring is a torsion spring having a first end bearing against a top surface of said pull ring and a second end bearing against a bottom surface of said cam arm.

21. A female coupling unit comprising:
a generally cylindrical body having an inside wall defining a bore which extends axially of said body between first and second end faces of said body, said bore adapted for receiving a male coupling unit at said first end face of said body and said body further having:
(a) an opening extending through said body, and
(b) at least one ear projecting from an outside wall of said body adjacent said opening in said body;

a cam arm mounted to said body at said opening in said body for pivotal movement relative to said body between a first pivotal locked position and a second pivotal released position and having:

(a) a cam surface:
   (1) projecting from within said opening in said body into said bore in said body and adapted to engage a male coupling unit received by said bore in said body when said cam arm is in said first pivotal locked position, and
   (2) retracted into said opening in said body from said bore in said body and adapted to be disengaged from a male coupling unit received by said bore in said body when said cam arm is in said second pivotal released position, and (b) an ann portion;

a finger pull member attached to a free end of said of said arm portion of said cam arm for pivotal movement of said finger pull member relative to said cam arm between a first pivotal locked position and a second pivotal released position for moving said cam arm from said first pivotal locked position of said cam arm to said second pivotal released position of said cam arm, said finger pull member:

(a) abutting against said ear upon pivotal movement of said cam arm from said first pivotal locked position of said cam arm toward said second pivotal released position of said cam arm while said finger pull member is in said first pivotal locked position of said finger pull member to prevent pivotal movement of said cam arm to said second pivotal released position of said cam arm, and (b) free of said ear upon pivotal movement of said finger pull member from said first pivotal locked position of said finger pull member to said second pivotal released position of said finger pull member to permit pivotal movement of said cam arm to said second pivotal released position of said cam arm.

22. A safety locking coupling assembly comprising:

a generally cylindrical male coupling unit, and a female coupling unit including (a) a generally cylindrical body having an inside wall defining a bore which extends axially of said body between first and second end faces of said body and within which said male coupling unit is fitted from said first end face of said body, said body further having:
   (1) an opening extending through said body, and
   (2) at least one ear projecting from an outside wall of said body adjacent said opening in said body;

(b) a cam arm mounted to said body at said opening in said body for pivotal movement relative to said body between a first pivotal locked position and a second pivotal released position and having:

(1) a cam surface:
      (i) projecting from within said opening in said body into said bore in said body and adapted to engage said male coupling unit received by said bore in said body when said cam arm is in said first pivotal locked position, and
      (ii) retracted into said opening in said body from said bore in said body and adapted to be disengaged from said male coupling unit received by said bore in said body when said cam arm is in said second pivotal released position, and (2) an arm portion;

(c) a finger pull member attached to a free end of said of said arm portion of said cam arm for pivotal movement of said finger pull member relative to said cam arm between a first pivotal locked position and a second pivotal released position for moving said cam arm from said first pivotal locked position of said cam arm to said second pivotal released position of said cam arm, said finger pull member:
   (1) abutting against said ear upon pivotal movement of said cam arm from said first pivotal locked position of said cam arm toward said second pivotal released position of said cam arm while said finger pull member is in said first pivotal locked position of said finger pull member to prevent pivotal movement of said cam arm to said second pivotal released position of said cam arm, and
   (2) an arm portion;

(c) a finger pull member attached to a free end of said of said arm portion of said cam arm for pivotal movement of said finger pull member relative t said cam arm between a first pivotal locked position and a second pivotal released position for moving said cam arm from said first pivotal locked position of said cam arm to said second pivotal released position of said cam arm, said finger pull member:

(1) abutting against said ear upon pivotal movement of said cam arm from said first pivotal locked position of said cam arm toward said second pivotal released position of said cam arm while said finger pull member is in said first pivotal locked position of said finger pull member to prevent pivotal movement of said cam arm to said second pivotal released position of said cam arm, and (2) free of said ear upon pivotal movement of said finger pull member from said first pivotal locked position of said finger pull member to said second pivotal released position os said finger pull member to permit pivotal movement of said cam arm to said second pivotal released position of said cam arm.

* * * * *